United States Patent [19]

Dadone

[11] 4,314,795
[45] Feb. 9, 1982

[54] ADVANCED AIRFOILS FOR HELICOPTER ROTOR APPLICATION

[75] Inventor: Leone U. Dadone, West Chester, Pa.

[73] Assignee: The Boeing Company, Seattle, Wash.

[21] Appl. No.: 79,706

[22] Filed: Sep. 28, 1979

[51] Int. Cl.³ .............................................. B64C 27/46
[52] U.S. Cl. .................................. 416/223 R; 416/237
[58] Field of Search ................. 416/226, DIG. 2, 223, 416/237

[56] References Cited

U.S. PATENT DOCUMENTS

| | | | |
|---|---|---|---|
| 2,614,639 | 10/1952 | Richard | 416/DIG. 2 |
| 3,173,490 | 3/1965 | Stuart | 416/DIG. 2 |
| 3,343,512 | 9/1967 | Rasmussen | 416/223 R X |
| 3,721,507 | 3/1973 | Monteleone | 416/223 R |
| 3,728,045 | 4/1973 | Balch | 416/223 R |
| 3,822,105 | 7/1974 | Jepson | 416/223 R |
| 4,142,837 | 3/1979 | deSimone | 416/223 R |

FOREIGN PATENT DOCUMENTS 732112  6/1955  United Kingdom ......... 416/DIG. 2

Primary Examiner—Everette A. Powell, Jr.
Attorney, Agent, or Firm—Robert S. Lipton; Jack D. Puffer

[57] ABSTRACT

A family of airfoils for use in rotary wing aircraft, particularly helicopters, is disclosed. The family is characterized by having a maximum $c_{l max}$ at M=0.4 and maximum delay in drag divergence while maintaining zero lift pitching moment levels $c_{mo}$ correctable within the range of −0.01 to +0.01. The present family of airfoils provide high lift at maximum angle of attack when the blade is retreating and maximum delay in drag rise or drag divergence when the blade is advancing. The airfoil section of the family enable a helicopter rotor to counteract, more efficiently, the rolling moment which would otherwise be induced by a rotorcraft's forward flight; this is achieved by the present family of airfoils while maintaining the airfoil sectional pitching moment coefficient at or about zero thereby enabling the blade in which the airfoil sections are incorporated to impose minimum structural loads on the rotorcraft's control system.

24 Claims, 16 Drawing Figures

ADVANCED AIRFOILS FOR HELICOPTER ROTOR APPLICATION

BACKGROUND OF THE INVENTION

This invention relates generally to helicopter rotor blades and their cross sectional airfoil shape, in particular. The airfoils are particularly suited for use in conjunction with rotors such as those used by helicopters or other types of rotorcraft. The airfoils are designed so as to have maximum lift characteristics at high angle of attack when the blade is retreating and maximum delay in drag rise or drag divergence when the blade is advancing, thus enabling the rotor to counteract the rolling moment which would otherwise be induced by the aircrafts forward flight. This is accomplished while maintaining an airfoil sectional pitching moment coefficient at or about zero so as to enable the blade to impose minimum structural loads on the rotor blade and control system, including the pitch mechanism.

DESCRIPTION OF THE PRIOR ART

Many airfoils and families are well known in the prior art. A great many families of airfoils were developed by NACA, National Advisory Committee of Aeronautics, a predecessor to the National Aeronautics and Space Administration of the United States of America, as a result of work performed in the 1930's and 1940's. This information has been published and is available in most technical libraries throughout the world and is well known to aerodynamicists. Most commercially successful helicopters have utilized airfoils in their rotor blades from the following three families of airfoils: NACA OOXX, NACA 230XX and the NACA 8 series, where XX represents the airfoil thickness,

SUMMARY OF THE INVENTION

It is an object of the present invention to provide a novel and improved family of airfoils which generate maximum lift and maximum delay drag divergence while having a pitching moment coefficient substantially equal to zero.

It is an object of the present invention to provide a family of airfoils for use with helicopter rotors having the aforesaid characteristics.

Other objects, features and advantages of the present family of airfoils will be apparent from the description which follows, taken together with the accompanying drawings in which like numerals refer to like parts.

DESCRIPTION OF THE PREFERRED EMBODIMENT

Figure 1:
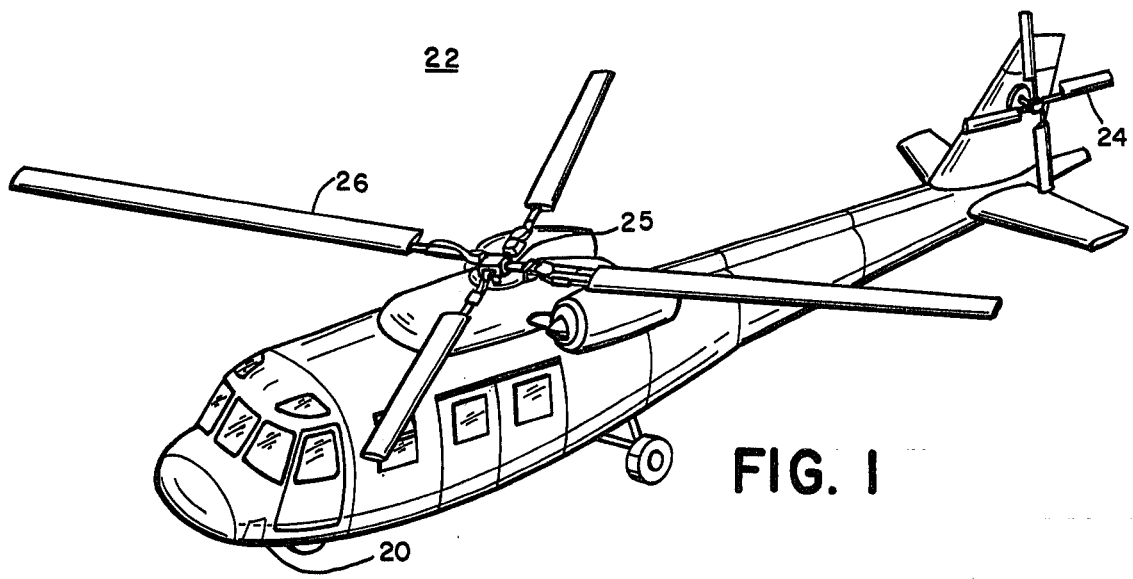
FIG. 1 is a perspective view of a helicopter having rotor blades embodying airfoils of the present invention.

FIG. 1 shows a perspective view of a single rotor helicopter 20 which has a main lifting rotor 22, and a tail rotor 24 to counteract torque and control the aircraft about its yaw axis. The main rotor 22 includes a hub 25 and rotor blades 26. In operation the rotor 22 rotates in a counterclockwise direction, as viewed from the top of the helicopter, generating lift as it rotates.

As the rotor rotates airfoil sections further out along the span of a particular blade encounter higher velocities compared to inboard airfoil sections. Additionally, when the helicopter is in forward flight, any particular airfoil section encounters higher velocities on the advancing side of the rotor as compared to that same airfoil section when it is on the retreating side of the rotor. This results in the advancing side of the rotor being capable of generating a greater amount of lift than the retreating side of the rotor, resulting in a moment which tends to rotate the aircraft abouts its longitudinal axis. In order for the helicopter to maintain a level attitude while in forward flight it is necessary that each rotor blade 26 be pitched about its longitudinal axis, which extends radially from the rotor hub. The blade pitch, or angle of attack $\alpha$ of each blade, is decreased when it is on the advancing side of the rotor 22 so as to generate less lift and is increased while it is on the retreating side of the rotor so as to generate greater lift. Thus, the advancing and retreating halves of the rotor are caused to generate an equal amount of lift, thus, eliminating the rolling moment which would otherwise rotate the aircraft about its roll axis.

In order that the rotor blades 26 may be pitched about their longitudinal axis they are mounted to the rotor hub 22 through the use of pitch bearings, or through other means which permit such rotation. The angle of the blades is varied and maintained by pitch links which are connected to a swashplate. The swashplate is, in turn, connected to control system actuators.

Severe stresses are imposed upon the rotor blade pitch control mechanism due to the aerodynamic and dynamic forces generated by the rotor blade 26 about its various axes. A significant component of the pitching moment magnitude results from the pitching moment characteristics of the particular airfoil or airfoils selected for use in the rotor blade. Typically, the magnitude of these control loads has been a limiting factor in rotor design.

Another undesirable effect of the pitching moment generated by the airfoil is a tendency to twist the rotor blade. This may have undesirable aerodynamic consequences as it changes the local blade section angle of attack and it may result in decreasing rotor performance.

Figure 2:
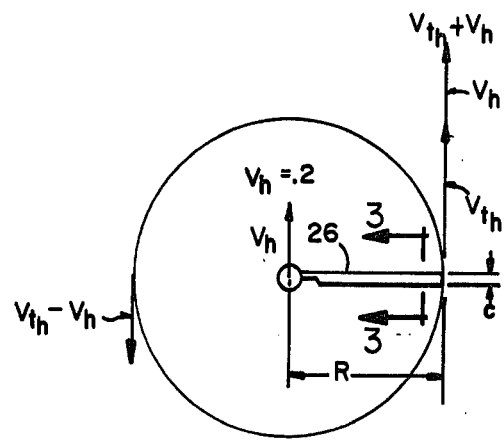
FIG. 2 is a schematic representation of a rotor disk of a helicopter.

As in most airfoil applications, lift and drag are also primary characteristics. It is almost always an objective to maximize lift while, at the same time, minimizing drag, as this reduces the power required to operate the aircraft. The airfoil performance characteristics, i.e., lift, drag, and pitching moment, in the mach number range of 0.3 to 0.9 are particularly significant for rotor applications. This is due to the fact that the local mach number at those airfoil sections along the blade span which produce most of the lift generated by the rotor are operating within this Mach Number range. This range is applicable to most rotors, notwithstanding differences in size and operating RPM. This results from the fact that in order to reduce shock effects on the advancing side of the rotor to mach number of the rotor blade tip is kept below one (1). FIG. 2 shows a schematic representation of the rotor 22. The center of the rotor is shown advancing forward at a mach number of 0.2. A rotor blade 26 is shown at its midpoint position on the advancing side of the rotor 22. The rotor blade 26 has a Radius R and a chord c. The radius of the rotor blade is defined as the distance between its center of rotation to its tip, while the chord is defined as the distance from the blade leading edge to its trailing edge. As is known to those skilled in the art, most helicopter rotors operate at a constant RPM. The particular rotational velocity, for a particular helicopter, is a function of the rotor diameter and the operating speed of the helicopter. In hover the rotor blade tip will have a particular velocity $V_{th}$, however, when the aircraft is in forward flight the actual velocity of the tip $V_t$ will be equal to $V_{th}$ plus the forward velocity of the helicopter $V_h$ on the advancing side of the rotor. On the retreating side of the rotor $V_t$ will be equal to $V_{th}$ minus $V_h$. As previously indicated, the rotor must be designed so that the maximum tip velocity $V_{tmax}$ will be below $M=1$. This is accomplished by varying the rotor diameter, rotor RPM, and the maximum forward velocity of the helicopter.

Due to the limit of maintaining $V_t$ below a mach number of one (1) the general criteria for selection of airfoil sections for helicopter rotors are similar. However, the criteria becomes much more stringent for high speed helicopters. The criteria for large low speed helicopters presents a different set of problems as their blades are generally much larger, therefore, introducing reynolds number effects which are different for the smaller high speed helicopter blades. These differences are well known to the aerodynamicists and are accordingly, taken into account as a matter of design.

Figure 3:
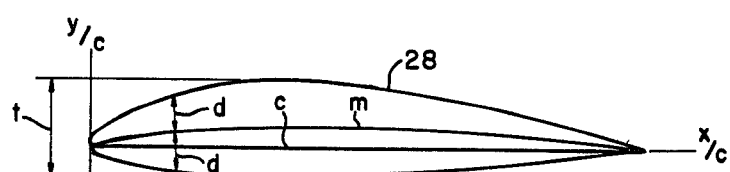
FIG. 3 is a section view of one of the rotor blades of the helicopter taken along like 3—3 in FIG. 2 showing an airfoil section and the nomenclature associated in the description thereof.

FIG. 3 is a section view of one of the rotor blades 26 taken along line 3—3 in FIG. 2 showing an airfoil section of the present invention. The airfoil is shown in schematic form for purposes of description. The nomenclature used in describing airfoils will be briefly discussed. The chord line c of the airfoil is defined as a straight line between the leading and trailing edges of the airfoil. The maximum thickness of the airfoil is also shown and is generally expressed as a percent of the chord c. Airfoils are described using a cartesian coordinate system wherein the X axis is coincident with the chord line and the leading edge is at the origin. An airfoil is described by locating the perpendicular distance points on the upper and lower surfaces are displaced from a particular point on the chord. Airfoil descriptions are generalized by non-dimensionalizing the coordinates. This is done by dividing the X and Y distances by the chord length and therefore expressing the vertical and chordwise as y/c and x/c respectively.

The mean line m, like the chord line c, passes through the leading and trailing edges of the airfoil but is defined such that the distance to the upper and lower surfaces of the airfoil from a point on the mean line, along a perpendicular to a line tangent to the mean line at that point, are always equal. For symmetrical airfoils the upper and lower surfaces are identical and the means line is coincident with the chord line. The mean line m represents the degree of curvature, or camber, of the airfoil as a whole. Generally, as is well known to aerodynamicists, the degree of camber, or degree of curvature of the mean line m influences the airfoils maximum coefficient of lift, $c_{lmax}$ and pitching moment coefficient at zero lift, $c_{mo}$. The airfoils of the present invention are non-symmetrical and hence cambered airfoils.

The lift generated by a particular airfoil section is a function of its angle of attack $\alpha$. By NACA definition the angle of attack is the angle between the free stream velocity vector V and the airfoil chord line.

In selecting airfoil sections for use in helicopter rotor blades the lift and drag characteristics of the airfoil must be analyzed. However, the airfoils to be considered must have acceptable pitching moment characteristics. Pitching moment characteristics are represented by the moment coefficient, $c_m$ while lift and drag are represented by the coefficient of lift and coefficient of drag $c_l$ and $c_d$, respectively. The moment coefficient $c_m$, of an airfoil section, generally varies with blade angle of attack. However, it is generally accepted within the field that such a variation is small. In reviewing the lift and drag characteristics, airfoils are selected which have pitching moment characteristics, when the blade is generating zero lift, $c_{mo}$ at mach numbers below $M=0.4$, within the range of $-0.01$ to $+0.01$. However, it is becoming recognized that a low speed $c_{mo}$ be within the range of zero to $+0.01$ is most desirable. As is common practice in aerodynamics pitching moments are generally measured about the airfoils quarter chord. Accordingly, all references to pitching moment and the pitching moment coefficient $c_m$ and $c_{mo}$ herein are about an airfoil quarter chord.

A positive $c_m$ indicates a moment which will tend to rotate the nose of the airfoil up, while a negative $c_m$ indicates a nose down moment.

The maximum lifting capabilities of an airfoil are represented by the maximum coefficient of lift, $c_{lmax}$. This parameter is important when the helicopter rotor blade is retreating, as this is when the blade must demonstrate its maximum lifting capability. A helicopter airfoil is generally selected on the basis of its $c_{lmax}$ at mach numbers typical of the retreating blade environment. A mach number of 0.4 is generally selected for this purpose as this speed represents the average velocity at which retreating blade stall inception becomes significant for helicopter high speed flight.

The drag characteristics of an airfoil are represented by its coefficient of drag $c_d$. It is generally recognized that $c_d$ increases with increasing Mach No. M. However, it has been found that at some point below the speed of sound ($M=1$) there is a sharp increase in the rate at which drag increases with increasing mach number. This point of increase is known as the point of drag divergence, $M_{dd}$. As with other aerodynamic parameters, the coefficient of drag $c_d$ and, hence, the point of drag divergence $M_{dd}$ vary with the angle of attack $\alpha$ of a given airfoil section. Accordingly, for purposes of comparison and airfoil selection, $M_{dd}$ at the airfoils point of zero lift $M_{ddo}$ is used.

Figure 4:
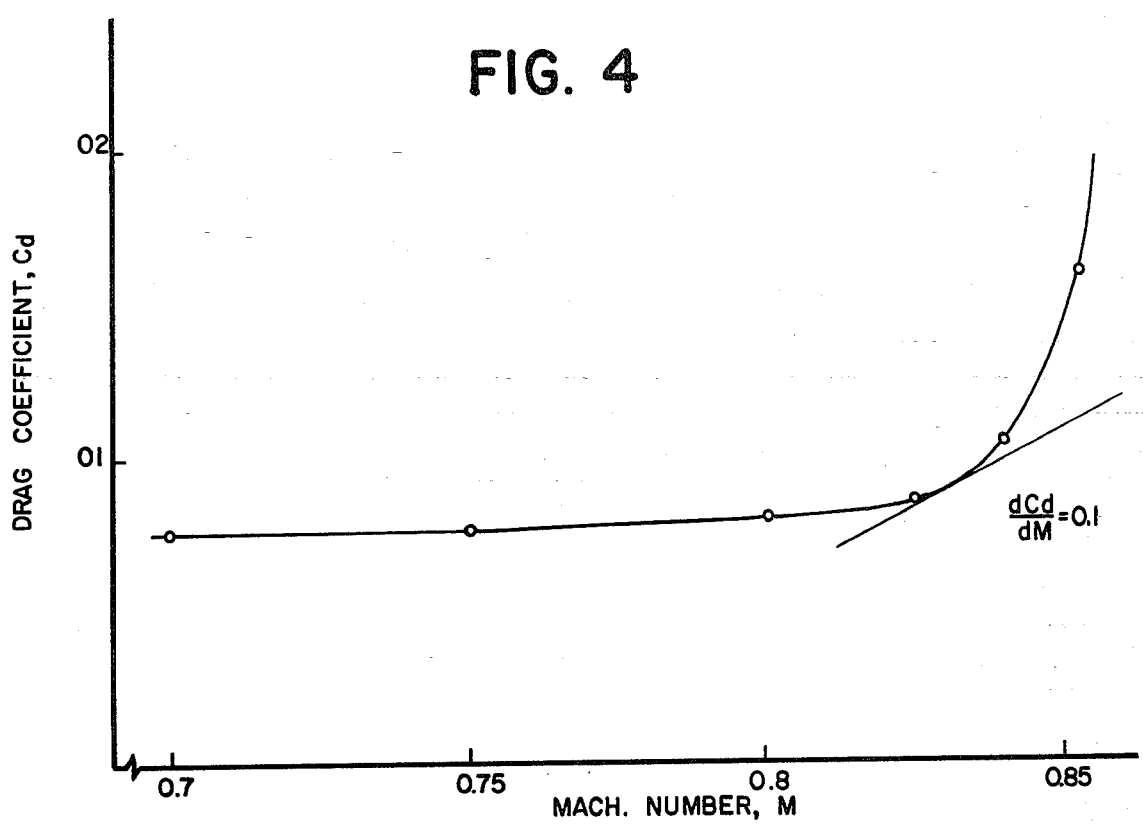
FIG. 4 is a graph showing the drag coefficient $c_d$ versus mach number M.

A plot of the coefficient of drag at zero lift $c_{do}$ versus mach number M is shown in FIG. 4. The point at which the rate of change of $c_d$ with respect to M, is $dc_d/dM=0.1$ is the generally recognized definition of mach number for drag divergence, $M_{dd}$. This is shown in FIG. 4 as the point at which the straight line representing $dc_d/dM = 0.1$ is tangent to the line representing $c_{do}$ versus M. The mach number at that point is the drag divergence Mach number at zero lift, $M_{ddo}$.

Figure 5:
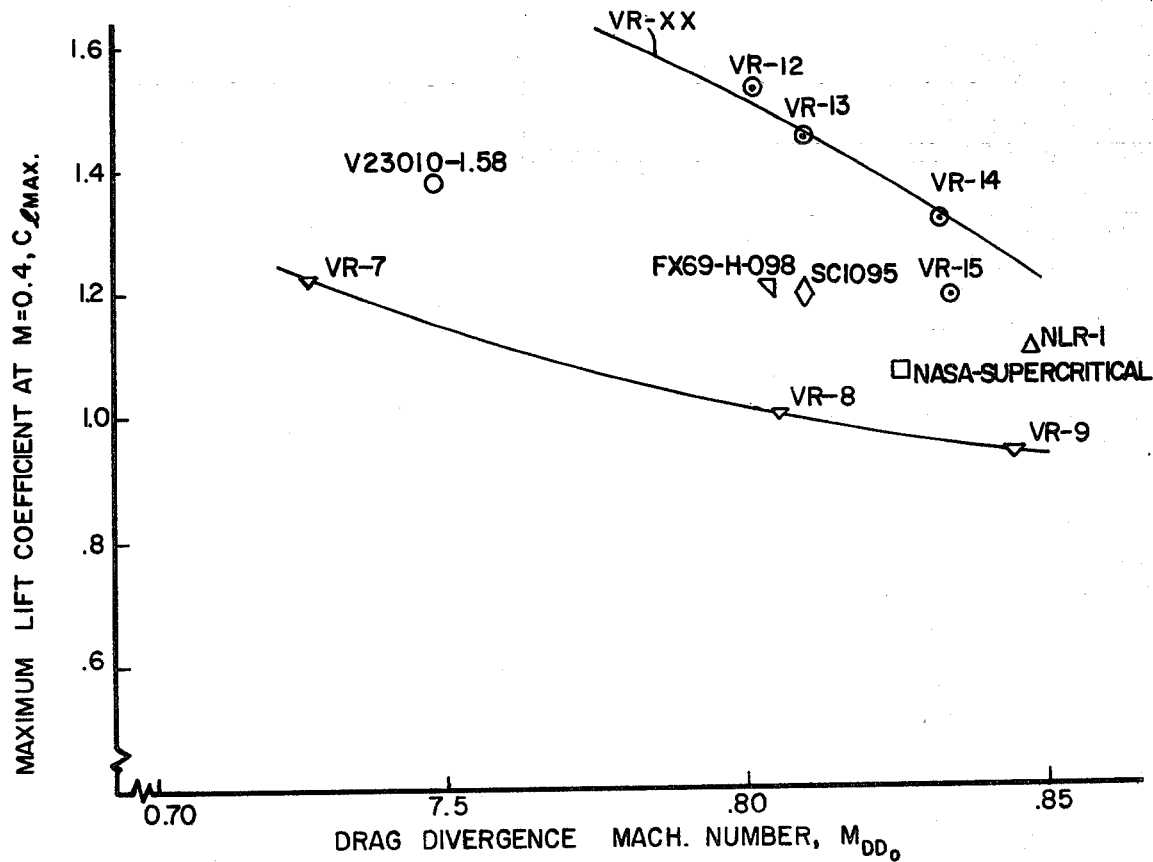
FIG. 5 shows the maximum lift coefficient $c_{l max}$ versus drag divergence mach number $M_{ddo}$.
Figure 6A:
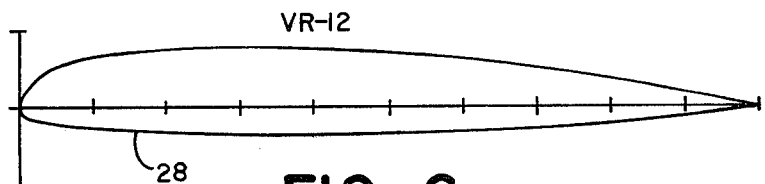
FIGS. 6a–d show the contours of four airfoils of the family of airfoils of the present invention.
Figure 6B:
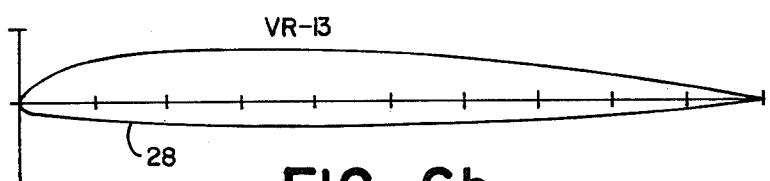
Figure 6C:
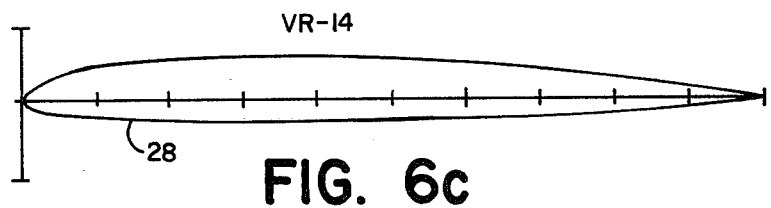
Figure 6D:
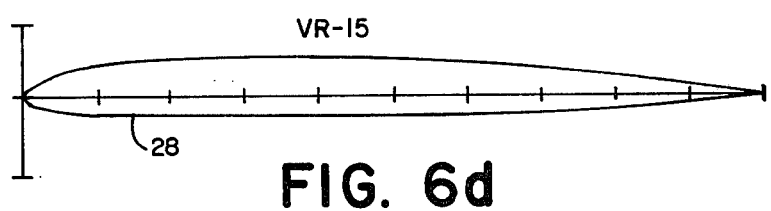

A plot of the maximum coefficient of lift $c_{lmax}$, at a mach number of 0.4 versus $M_{ddo}$ is shown in FIG. 5. Any point on this graph represents a single particular non-demensionalized airfoil. In some instances, as will be referred to subsequently, a line indicates a family of airfoils. Generally, the airfoils appearing in FIG. 5 have a $c_{mo}$ within the range of −0.01 to 0.01. The position of any particular airfoil or family of airfoils shown in FIG. 5 is, of course, valid only when the maximum coefficient of lift is taken at a mach number of 0.4. In general, the further a particular airfoil is from the origin, the more desirable it is for helicopter use. The characteristics of the family airfoils of the present invention are shown in FIG. 5 as VR-XX, where arbitrary numerals are substituted for XX to identify particular airfoil sections. This designation system has been used as the airfoils do not lend themselves to any of the standard designation systems currently in use, such as some of the NACA designation systems. The airfoils of the present invention have a $c_{mo}$ falling within the range of −0.01 to 0.01. The performance characteristics of the present family of airfoils, which form the basis of VR-XX in FIG. 5 are shown in Table I. Experimental wind tunnel data has shown the airfoils of the present invention to have a $c_{mo}$ of approximately −0.006±0.002.

The performance curve of the family of the present invention shown in FIG. 5 and set forth in Table I is based on wind tunnel test data. The test data has a scatter which results in a deviation of ±0.025 in the value of $c_{lmax}$. The performance values of particular airfoils in FIG. 5 are based on wind tunnel tests of airfoils having a chord of 13 inches and is also set forth in Table IX.

TABLE I

| $M_{ddo}$ | $c_{lmax}$ (M = 0.4) |
|---|---|
| 0.78 | 1.60 |
| 0.79 | 1.55 |
| 0.80 | 1.50 |
| 0.81 | 1.45 |
| 0.82 | 1.38 |
| 0.83 | 1.33 |
| 0.84 | 1.26 |
| 0.85 | 1.20 |

As previously indicated, the design criteria for the present family of airfoils included a requirement that $c_{mo}$ fall within the range of −0.01 to +0.01. In designing and selecting airfoils the value of $c_{mo}$ is taken at "low speeds". "Low speeds" in this context generally refers to mach numbers sufficiently low that compressibility effects can be ignored. In fact, $c_{mo}$ varies linearly with mach numbers at a low rate. The rate is sufficiently low that $c_{mo}$ at operating mach numbers will still be generally within the range of −0.01 to +0.01 if $c_{mo}$ at low speeds is within that range. However, just as there is a sharp change in the drag versus mach number curve, there is also a sharp change in the $c_m$ versus mach number curve. The sharp break in the moment curve occurs at a mach number very close to the drag divergence mach number. Accordingly, the value of $c_{mo}$ at low speeds, i.e., those speeds where compressibility effects can be neglected, generally a mach number below 0.3 is representative of the aerodynamic pitching moment until Mach numbers approaching the drag divergence mach number are reached.

The present invention was developed and discovered in an attempt to identify and design airfoils in accordance with the foregoing criteria. The effort involved various theoretical design tools such as the viscus transonic analysis developed by NASA, potential flow and boundary layer theories. Once having commenced the effort using the theoretical tools available, the airfoils were changed based upon the experience and intuition of the inventor. Subsequent to such changes, performance characteristics of the changed airfoils were determined using the computerized theoretical tools available. This was successively done in an iterative process. The most promising airfoils were then subjected to extensive wind-tunnel testing.

The family of airfoils of the present invention is set forth in Table II. The basic coordinates of the airfoil are set forth in a non-dimensional form, normalized for a thickness ratio of one (1). The nomenclature used in the table is as follows: x is a distance from the leading edge of the airfoil towards the leading edge, c is the chord length of the airfoil, y is a perpendicular distance with respect to the airfoil chord line to a point on the airfoil surface, the subscript u indicates the upper surface and the subscript l indicates the lower surface, and t equals the maximum thickness of the airfoil. The coordinates of points which define the airfoil are shown in non-dimensionalized form, as is the convention in the art, by locating a point on the airfoil by its coordinates x/c and y/c.

TABLE II

VR-XX
(t/c = 1.0)

| x/c | $y_u$/c | x/c | $y_l$/c |
|---|---|---|---|
| 0.0 | 0.0 | 0.0 | 0.0 |
| .00012 | .02263 | .00055 | −.0235405 |
| .00080 | .0584313 | .00200 | −.0442561 |
| .00195 | .0912241 | .0040 | −.0635593 |
| .00340 | .1204614 | .0062 | −.0790960 |
| .00520 | .1489642 | .0086 | −.0925612 |
| .00700 | .1728437 | .011 | −.10310734 |
| .00900 | .1959793 | .01465 | −.1158192 |
| .01105 | .2171375 | .01955 | −.1271186 |
| .01415 | .245744 | .02615 | −.1393597 |
| .01860 | .2817326 | .0343 | −.1511299 |
| .02450 | .323352 | .04449 | −.1638418 |
| .03205 | .369209 | .0569 | −.177966 |
| .0416 | .416666 | .07245 | −.193032 |
| .0535 | .467985 | .0924 | −.20809793 |
| .0685 | .520716 | .1185 | −.2245763 |
| .0880 | .570621 | .15 | −.2405838 |
| .1140 | .6177024 | .20 | −.259887 |
| .15 | .6591337 | .25 | −.2740113 |
| .20 | .689266 | .3 | −.2834275 |
| .25 | .702448 | .35 | −.2900188 |
| .30 | .7071563 | .4 | −.2928437 |
| .35 | .7048023 | .45 | −.29190207 |
| .40 | .6949152 | .5 | −.2886064 |
| .45 | .6756120 | .55 | −.28248588 |
| .50 | .6506591 | .6 | −.27369115 |
| .55 | .6153484 | .65 | −.26129943 |
| .60 | .57124294 | .69 | −.24880132 |
| .65 | .5155367 | .73 | −.2337476 |
| .69 | .4644322 | .77 | −.21566855 |
| .73 | .4079473 | .81 | −.19503766 |
| .77 | .3493785 | .845 | −.17440207 |
| .81 | .289670 | .88 | −.1511516 |
| .845 | .233724 | .91 | −.12538606 |
| .88 | .176575 | .935 | −.1020245 |
| .91 | .1282109 | .955 | −.08259416 |
| .935 | .0879002 | .97 | −.0638795 |
| .955 | .05811205 | .98 | −.04919021 |
| .97 | .0398682 | .99 | −.03354708 |
| .98 | .0294162 | .995 | −.02383 |
| .99 | .0203644 | 1.0 | −.0141243 |
| .995 | .0163041 | | |
| 1.0 | .0141243 | | |

TABLE II-continued

VR-XX
(t/c = 1.0)

| x/c | $y_u/c$ | x/c | $y_l/c$ |
|---|---|---|---|

Leading Edge Parabola:
$(y_u/c)^2 = 4.2676129 \, (t/c)^2 \, (x/c)$
$(y_l/c)^2 = (t/c)^2 \, (x/c)$ As previously indicated, the family of airfoils set forth in Table II has been normalized, i.e., defined for a thickness ratio of one (1). This literally means that the thickness of the airfoil is equal to its chord length. This normalized approach is used in defining a family of airfoils in order to enable aerodynamicists to simply and easily select a non-dimensionalized airfoil having a particular thickness ratio t/c. The thickness ratio t/c may be expressed as a percent, for example, 10% for t/c=0.10. In selecting a non-dimensionalized airfoil from the family of airfoils set forth in Table II having a particular thickness ratio t/c it is necessary to multiply both the upper and lower y/c values by the desired thickness ratio, for example, in selecting a non-dimensionalized airfoil having a 10% thickness ratio it would be necessary to multiply both the upper and lower y/c values by 0.1. Airfoils having thickness distributions of 10.62%, 9.5% and 8% are shown in Tables III, IV and V, respectively. These airfoil have been identified as VR-12, VR-13, and VR-14 respectively and graphic approximations are shown in FIG. 6.

TABLE III

VR-12
(t/c = .1062)

| x/c | $y_u/c$ | x/c | $y_l/c$ |
|---|---|---|---|
| 0.0 | 0.0 | 0.0 | 0.0 |
| .00012 | .0024033 | .00055 | −.0025 |
| .0008 | .0062054 | .002 | −.0047 |
| .00195 | .009688 | .004 | −.00675 |
| .0034 | .012793 | .0062 | −.0084 |
| .0052 | .01582 | .0086 | −.00983 |
| .007 | .018356 | .011 | −.01095 |
| .009 | .020813 | .01465 | −.0123 |
| .01105 | .02306 | .01955 | −.0135 |
| .01415 | .026098 | .02615 | −.0148 |
| .0186 | .02992 | .0343 | −.01605 |
| .0245 | .03434 | .04449 | −.0174 |
| .03205 | .03921 | .0569 | −.0189 |
| .0416 | .04425 | .07245 | −.0205 |
| .0535 | .0497 | .0924 | −.0221 |
| .0685 | .0553 | .1185 | −.02385 |
| .088 | .0606 | .15 | −.02555 |
| .114 | .0656 | .20 | −.0276 |
| .15 | .07 | .25 | −.0291 |
| .20 | .0732 | .30 | −.0301 |
| .25 | .0746 | .35 | −.0308 |
| .30 | .0751 | .40 | −.0311 |
| .35 | .07485 | .45 | −.031 |
| .40 | .0738 | .50 | −.03065 |
| .45 | .07175 | .55 | −.03 |
| .50 | .0691 | .60 | −.029066 |
| .55 | .06535 | .65 | −.02775 |
| .60 | .060666 | .69 | −.0264227 |
| .65 | .05475 | .73 | −.024824 |
| .69 | .0493227 | .77 | −.022904 |
| .73 | .043324 | .81 | −.020713 |
| .77 | .037104 | .845 | −.0185215 |
| .81 | .030763 | .88 | .0160523 |
| .845 | .0248215 | .91 | −.013316 |
| .88 | .0187523 | .935 | −.010835 |
| .91 | .013616 | .955 | −.0087715 |
| .935 | .009335 | .97 | −.006784 |
| .955 | .0061715 | .98 | −.005224 |
| .97 | .004234 | .99 | −.0035627 |
| .98 | .003124 | .995 | −.0025315 |
| .99 | .0021627 | 1.0 | −.0015 |
| .995 | .0017315 | | |
| 1.0 | .0015 | | |

Leading Edge Parabola:
$(y_u/c)^2 = 4.2676129 \, (t/c)^2 \, (x/c)$
$(y_l/c)^2 = (t/c)^2 \, (x/c)$

TABLE IV

VR-13
(t/c = .095)

| x/c | $y_u/c$ | x/c | $y_l/c$ |
|---|---|---|---|
| 0.0 | 0.0 | 0.0 | 0.0 |
| 0.000120 | 0.002150 | 0.000550 | −0.002236 |
| 0.000800 | 0.005551 | 0.002000 | −0.004204 |
| 0.001950 | 0.008666 | 0.004000 | −0.006038 |
| 0.003400 | 0.011444 | 0.006200 | −0.007514 |
| 0.005200 | 0.014152 | 0.008600 | /c)$^{0.008793}$ |
| 0.007000 | 0.016420 | 0.011000 | −0.009795 |
| 0.009000 | 0.018618 | 0.014650 | −0.011003 |
| 0.011050 | 0.020628 | 0.019550 | −0.012076 |
| 0.014150 | 0.023346 | 0.026150 | −0.013239 |
| 0.018600 | 0.026765 | 0.034300 | −0.014357 |
| 0.024500 | 0.030718 | 0.044490 | −0.015565 |
| 0.032050 | 0.035075 | 0.056900 | −0.016907 |
| 0.041600 | 0.039583 | 0.072450 | −0.018338 |
| 0.053500 | 0.044459 | 0.092400 | −0.019769 |
| 0.068500 | 0.049468 | 0.118500 | −0.021335 |
| 0.088000 | 0.054209 | 0.150000 | −0.022855 |
| 0.114000 | 0.058682 | 0.200000 | −0.024689 |
| 0.150000 | 0.062618 | 0.250000 | −0.026031 |
| 0.200000 | 0.065480 | 0.300000 | −0.026926 |
| 0.250000 | 0.066733 | 0.350000 | −0.027552 |
| 0.300000 | 0.067180 | 0.400000 | −0.027820 |
| 0.350000 | 0.066956 | 0.450000 | −0.027731 |
| 0.400000 | 0.066017 | 0.500000 | −0.027418 |
| 0.450000 | 0.064183 | 0.550000 | −0.026836 |
| 0.500000 | 0.061813 | 0.600000 | −0.026001 |
| 0.550000 | 0.058458 | 0.650000 | −0.024823 |
| 0.600000 | 0.054268 | 0.690000 | −0.023636 |
| 0.650000 | 0.048976 | 0.730000 | −0.022206 |
| 0.690000 | 0.044121 | 0.770000 | −0.020489 |
| 0.730000 | 0.038755 | 0.810000 | −0.018529 |
| 0.770000 | 0.033191 | 0.845000 | −0.016568 |
| 0.810000 | 0.027519 | 0.880000 | −0.014359 |
| 0.845000 | 0.022204 | 0.910000 | −0.011912 |
| 0.880000 | 0.016775 | 0.935000 | −0.009692 |
| 0.910000 | 0.012180 | 0.955000 | −0.007846 |
| 0.935000 | 0.008351 | 0.970000 | −0.006069 |
| 0.955000 | 0.005521 | 0.980000 | −0.004673 |
| 0.970000 | 0.003787 | 0.990000 | −0.003187 |
| 0.980000 | 0.002975 | 0.995000 | −0.002265 |
| 0.990000 | 0.001935 | 1.000000 | −0.001342 |
| 0.995000 | 0.001549 | | |
| 1.000000 | 0.001342 | | |

Leading Edge Parabola:
$(y_u/c)^2 = 4.2676129 \, (t/c)^2 \, (x/c)$
$(y_l/c)^2 = (t/c)^2 \, (x/c)$

TABLE V

VR-14
(t/c = .08)

| x/c | $y_u/c$ | x/c | $y_l/c$ |
|---|---|---|---|
| 0.0 | 0.0 | 0.0 | 0.0 |
| .00012 | .00181 | .00055 | −.001883 |
| .0008 | .004675 | .002 | −.00354 |
| .00195 | .007298 | .004 | −.005085 |
| .0034 | .009637 | .0062 | −.06328 |
| .0052 | .011917 | .0086 | −.007405 |
| .007 | .013827 | .011 | −.008249 |
| .009 | .015678 | .01465 | −.009266 |
| .01105 | .017371 | .01955 | −.010169 |
| .01415 | .01966 | .02615 | −.011149 |
| .0186 | .022539 | .0343 | −.01209 |

TABLE V-continued

VR-14
(t/c = .08)

| x/c | $y_u/c$ | x/c | $y_l/c$ |
|---|---|---|---|
| .0245 | .025868 | .04449 | −.013107 |
| .03205 | .029537 | .0569 | −.014237 |
| .0416 | .033333 | .07245 | −.015443 |
| .0535 | .037439 | .0924 | −.016648 |
| .0685 | .041657 | .1185 | −.017966 |
| .088 | .04565 | .15 | −.019247 |
| .114 | .049416 | .20 | −.020791 |
| .15 | .052731 | .25 | −.021921 |
| .20 | .055141 | 30 | −.022674 |
| .25 | .056196 | .35 | −.023202 |
| .30 | .056573 | .40 | −.023427 |
| .35 | .056384 | .45 | −.023352 |
| .40 | .055593 | .50 | −.023089 |
| .45 | .054049 | .55 | −.022599 |
| .50 | .052053 | .60 | −.021895 |
| .55 | .049228 | .65 | −.020904 |
| .60 | .045699 | .69 | −.019904 |
| .65 | .041243 | .73 | −.0187 |
| .69 | .037155 | .77 | −.017253 |
| .73 | .032636 | .81 | −.015603 |
| .77 | .02795 | .845 | −.013952 |
| .81 | .023174 | .88 | −.012092 |
| .845 | .018698 | .91 | −.010031 |
| .88 | .014126 | .935 | −.008162 |
| .91 | .010257 | .955 | −.006608 |
| .935 | .007032 | .97 | −.00511 |
| .955 | .004649 | .98 | −.003935 |
| .97 | .003189 | .99 | −.002684 |
| .98 | .002353 | .995 | −.001907 |
| .99 | .001629 | 1.0 | −.00113 |
| .995 | .001304 | | |
| 1.0 | .00113 | | |

Leading Edge Parabola:
$(y_u/c)^2 - 4.2676129 \, (t/c)^2 \, (x/c)$
$(y_l/c)^2 = (t/c)^2 \, (x/c)$ The basic family of airfoils set forth in Table II and the airfoils having particular thickness distributions set forth in Tables II, III, and IV are in a non-dimensionalized form. Once the desired chord length has been established both the x/c and y/c values are multiplied by the chord length, thus, yielding the actual coordinates for the proposed airfoil.

As may be seen in Table I the upper surface at the leading edge should be faired into a parabola of the form $(y_u/c)^2 = 4.2676129 \, (t/c)^2 \, (x/c)$ while the lower surface should be faired into a parabola having the approximate form of $(y_l/c)^2 = (t/c)^2 \, (x/c)$.

The performance characteristics of the airfoils of the present invention are shown in FIG. 5 as VR-xx where $c_{l max}$ versus $M_{ddo}$ is plotted. Shown close to that line are the experimentally determined characteristics of airfoils from the family of the present invention having thickness distributions of 10.62%, 9.5% and 8%, VR-12, VR-13, and VR-14, respectively. It will be observed in FIG. 5 that the thicker airfoil has a higher $c_{l max}$ coupled with a lower drag divergence mach number, than the other airfoils. Conversely, the thinner airfoil has a lower $c_{l max}$ with a correspondingly higher drag divergence mach number, while the airfoil having an intermediate thickness lies between the other two airfoils. It is generally recognized that there are both upper and lower limits with respect to the thickness of airfoil sections.

The upper and lower limits on airfoil thickness are due to a number of factors. As an airfoils thickness increases beyond a certain range its aerodynamic performance becomes unacceptable for practical applications. For example, as the airfoil becomes thicker, $c_{l max}$ increases but the drag divergence mach number decreases to a point where the airfoil becomes unacceptable. Additionally, various assumptions which were made in predicting the airfoils performance become invalid and the performance curve itself no longer represents an accurate indication of the thicker airfoils performance. These same principles apply when very thin airfoils are considered. Additionally, very thin airfoils become impractical as it becomes difficult, if not impossible, to construct them in a manner so as to carry design loads. It is generally recognized that most practical rotor airfoils have a thickness within the approximate range of 6 to 15%. Accordingly, it is to be understood that the present invention and the performance attributed to it are with respect to airfoils which have a thickness within the approximate range of 6 to 15% of the airfoils chord. It is to be particularly noted that Table I, which defines the present family of airfoils, is set forth for a thickness ratio of 1 or 100%, in conformance with custom, so as to provide ease in defining the family and extrapolating to particular thickness ratios.

As has previously been discussed, airfoils having a particular thickness ratio are generated by multiplying the upper and lower y/c values of Table II, by the desired maximum thickness ratio. It is possible, in some instances desirable as will be discussed, to generate an airfoil thickness in the family of airfoils by applying one thickness ratio or scaling factor to the y/c values for the upper surface and a different thickness ratio or scaling factor to the y/c values for the lower surface. Of course, the actual thickness ratio of the resulting airfoil would lie somewhere between the values of the two scaling factors used. The actual thickness ratio of the resulting airfoil may be determined after the particular airfoil has been generated or prior to its generation by conventional methods well known to aerodynamicists. The airfoil set forth in Table VI has a thickness distribution of 8% and was generated by using a scaling factor of 0.073534 for the upper surface and 0.095614 for the lower surface and has been identified as VR-15. When using this method the two scaling factors used to generate the airfoil should not differ by more than 20%. Larger differences would result in unverified and most likely undesirable combinations of upper and lower surface contours.

TABLE VI

VR-15
(t/c = .08)

| x/c | $y_u/c$ | x/c | $y_l/c$ |
|---|---|---|---|
| 0.0 | 0.0 | 0.0 | 0.0 |
| .00012 | .001664 | .00055 | −.002251 |
| .00089 | .004297 | .002 | −.004232 |
| .00195 | .006708 | .004 | −.006077 |
| .0034 | .008858 | .0062 | −.007563 |
| .0052 | .010954 | .0086 | −.00885 |
| .007 | .01271 | .011 | −.009859 |
| .009 | .014411 | .01465 | −.011074 |
| .01105 | .015967 | .01955 | −.012154 |
| .01415 | .018071 | .02615 | −.013325 |
| .0186 | .020717 | .0343 | −.01445 |
| .0245 | .023777 | .04449 | −.015666 |
| .03205 | .027149 | .0569 | −.017016 |
| .0416 | .030639 | .07245 | −.018457 |
| .0535 | .034413 | .0924 | −.019897 |
| .0685 | .03829 | .1185 | −.021473 |
| .088 | .04196 | .15 | −.023003 |
| .114 | .045422 | .20 | −.024849 |
| .15 | .048469 | .25 | −.026199 |
| .20 | .050684 | .30 | −.0271 |
| .25 | .051654 | .35 | −.02773 |
| .30 | .052 | .40 | −.028 |
| .35 | .051827 | .45 | −.02791 |
| .40 | .0511 | .50 | −.027595 |

TABLE VI-continued

VR-15
(t/c = .08)

| x/c | $y_u/c$ | x/c | $y_l/c$ |
|---|---|---|---|
| .45 | .04968 | .55 | −.02701 |
| .50 | .047846 | .60 | −.026169 |
| .55 | .045249 | .65 | −.024984 |
| .60 | .042006 | .69 | −.023789 |
| .65 | .037909 | .73 | −.02235 |
| .69 | .034152 | .77 | −.020621 |
| .73 | .029998 | .81 | −.018648 |
| .77 | .025691 | .845 | −.016675 |
| .81 | .021301 | .88 | −.014452 |
| .845 | .017187 | .91 | −.011989 |
| .88 | .012984 | .935 | −.009755 |
| .91 | .009428 | .955 | −.007897 |
| .935 | .006464 | .977 | −.006108 |
| .955 | .004273 | .98 | −.004703 |
| .97 | .002932 | .99 | −.003208 |
| .98 | .002163 | .995 | −.002279 |
| .99 | .001497 | 1.0 | −.00135 |
| .995 | .001199 | | |
| 1.0 | .001039 | | |

Leading Edge Parabola:
$(y_u/c)^2 = 4.2676129 \, (t/c)^2 \, (x/c)$
$(y_l/c)^2 = (t/c)^2 \, (x/c)$ As previously indicated, the airfoils of the present invention have been designed so that their pitching moment characteristics fall within the range of −0.01 to +0.01. Once a particular thickness and chord length have been determined, a particular airfoil from the present family of airfoils may be selected as previously described, utilizing Table II. That airfoil will have a particular $c_{mo}$. The value of $c_{mo}$ may be altered to meet particular design objectives with some change in $c_{l_{max}}$ and $M_{ddo}$ by utilizing different thickness scaling factors for the upper and lower surfaces of the airfoils such that the overall desired thickness is maintained. This procedure has the effect of changing the airfoils mean line or camber, and hence, varies the airfoils $c_{mo}$, $c_{l_{max}}$, and $M_{ddo}$. Increasing the thickness of the airfoils upper surface, at the expense of its lower surface, has the effect of increasing the airfoils camber, or degree of curvature, with the result that $c_{l_{max}}$ will increase $M_{ddo}$ will decrease, while $c_{mo}$ will become more negative. Of course, the converse is true, if an airfoil is decambered, i.e., the degree of curvature is reduced by using different thickness ratios for the upper and lower surface, $c_{l_{max}}$ will decrease, $M_{ddo}$ will increase, while $c_{mo}$ will become more positive, as compared to the basic airfoils section. This method of changing $c_{mo}$ will cause the airfoils $c_{l_{max}}$ and $M_{ddo}$ characteristics to change from those shown in FIG. 5 and set forth in Table I. Additionally, the amount of pitching moment change is relatively small.

This approach may be seen graphically with reference to FIG. 5 where the performance characteristics of VR-14 and VR-15 are shown. VR-14 is an 8% thick airfoil where a thickness scaling factor of 0.08% was applied to both the upper and lower surfaces. VR-15 is also an 8% thick airfoil. However, a thickness scaling factor of 0.073534 was applied to the upper surface while a scaling factor of 0.095614 was applied to the lower surface. Thus, it may be seen from Table IX that the VR-15 represents a decambering of VR-14 with an attendant reduction in $c_{l_{max}}$ and increase in $M_{ddo}$, with a change in the value of $c_{mo}$ toward positive values as set forth in Table IX. VR-15 is shown graphically in FIG. 6.

In designing a rotor utilizing the present family of airfoils one particular non-dimensionalized airfoil may be used. However, in the event a rotor is designed which utilizes blades having a non-constant chord, a single non-dimensionalized airfoil could still be used, although the actual physical dimensions of the airfoils along the blade span would vary. In some cases, even where a constant chord is used in the rotor blade, different non-dimensionalized airfoil sections are used along the span. Typically, airfoils having a smaller thickness ratio are used at the tip, while airfoils having a higher thickness ratio are utilized in the rotor blade root section. Airfoils having an intermediate thickness may be used at the mid-span region of the rotor blade. For example, the 10.62% thick airfoil, VR-12, set forth in Table III could be used from the root of the blade to about 85% of the blade radius while an 8% thick airfoil, such as VR-14 as set forth in Table V, could be used at the blade tip.

The airfoils of the present invention set forth in Table II and the particular non-dimensionalized airfoils with the family set forth in Tables III, IV, and V have, in accordance with the design criteria, a low speed zero lift pitching moment coefficient $c_{mo}$ within the range of −0.006±0.002. Should particular design requirements make it necessary, the pitching moment characteristics of the airfoil sections of the present family may be changed by altering the airfoils camber by using different scaling factors for the upper and lower surfaces, as previously described. Pitching moment characteristics may also be altered using trailing edge tabs or trailing edge wedges.

Figure 7A:
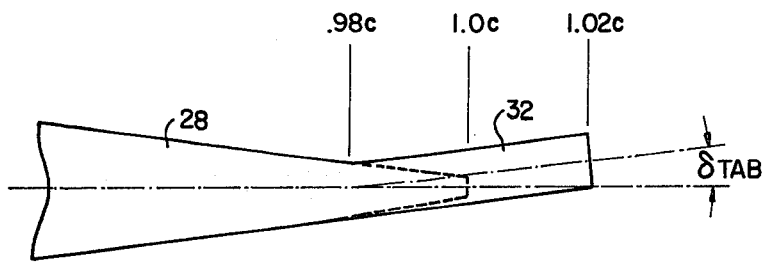
FIGS. 7a–c show trailing edge tabs which are used to alter the pitching moment characteristics of the airfoils of the present invention.
Figure 7B:
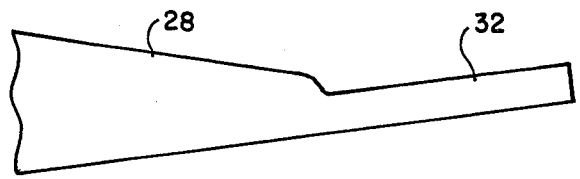
Figure 7C:

A tab is shown applied to an airfoil of the present invention in FIG. 7. A trailing edge of an airfoil of the present invention is shown with a trailing edge tab 32 connected to it. The tab is equal in length to 4% of the chord of the airfoil. The tab 32 is shown extending 2% beyond the original trailing edge of the airfoil. Accordingly, the center line of the tab, at the tab leading edge, intersects the chord line at a point 98% from the leading edge of the airfoil. The tab angle δ is, as shown, the angle between the tab 32 center line and the airfoil chord line. Depending on the thickness of the airfoil, of the present invention, a discontinuity between the airfoil surface and the tab may be present. This discontinuity may occur on the upper, lower, or both surfaces. This discontinuity may appear as a step. FIG. 7b shows an airfoil of the present invention and a tab, with a step on the upper surface, while FIG. 7c shows an airfoil and tab combination with a step on both upper and lower surfaces.

Test experience has shown that a tab having a length equal to 4% of the basic airfoil chord will provide an increase in $c_m$ of approximately 0.005 for each degree of tab angle δ, about the quarter chord of the airfoil.

It is to be noted that when a tab is added in accordance with the foregoing description the resultant airfoil has a chord length greater than 100% when the foregoing nomenclature and approach is utilized. In the example set forth above, the tab extends 2% beyond the trailing edge of the original airfoil section, resulting in a chord length of 102%. VR-12 with a 4% tab extending 2% beyond the trailing edge is set forth in Table VII. The 2% extension lowers the thickness ratio of the resultant airfoil so that t/c=0.104.

TABLE VII

VR-12 plus 4% tab
(t/c — .104)

| x/c | y_u/c | x/c | y_l/c |
|---|---|---|---|
| 0.0 | 0.0 | 0.0 | 0.0 |
| .00012 | .0024033 | .00055 | −.0025 |
| .0008 | .0062054 | .002 | −.0047 |
| .00195 | .009688 | .004 | −.00675 |
| .0034 | .012793 | .0062 | −.0084 |
| .0052 | .01582 | .0086 | −.00983 |
| .007 | .018356 | .011 | −.01095 |
| .009 | .020813 | .01465 | −.0123 |
| .01105 | .02306 | .01955 | −.0135 |
| .01415 | .026098 | .02615 | −.0148 |
| .0186 | .02992 | .0343 | −.01605 |
| .0245 | .03434 | .04449 | −.0174 |
| .03205 | .03921 | .0569 | −.0189 |
| .0416 | .04425 | .07245 | −.0205 |
| .0535 | .0497 | .0924 | −.0221 |
| .0685 | .0553 | .1185 | −.02385 |
| .088 | .0606 | .15 | −.02555 |
| .114 | .0656 | .20 | −.0276 |
| .15 | .07 | .25 | −.0291 |
| .20 | .0732 | .30 | −.0301 |
| .25 | .0746 | .35 | −.0308 |
| .30 | .0751 | .40 | −.0311 |
| .35 | .07485 | .45 | −.031 |
| .40 | .0738 | .50 | −.03065 |
| .45 | .07175 | .55 | −.03 |
| .50 | .0691 | .60 | −.029066 |
| .55 | .06535 | .65 | −.02775 |
| .60 | .060666 | .69 | −.0264227 |
| .65 | .05475 | .73 | −.024824 |
| .69 | .0493227 | .77 | −.022904 |
| .73 | .043324 | .81 | −.020713 |
| .77 | .037104 | .845 | −.0185215 |
| .81 | .030763 | .88 | −.0160523 |
| .845 | .0248215 | .91 | −.013316 |
| .88 | .0187523 | .935 | −.010835 |
| .91 | .013616 | .955 | −.0087715 |
| .935 | .009335 | .97 | −.006784 |
| .955 | .0061715 | .98 | −.0055 |
| .97 | .004234 | .99 | −.0047857 |
| .98 | .003124 | .995 | −.0045714 |
| .99 | .0021627 | 1.0 | −.0043571 |
| .995 | .0017315 | 1.0075 | −.0040357 |
| 1.0 | .0015 | 1.015 | −.0037143 |
| 1.0075 | .001875 | 1.02 | −.0035 |
| 1.015 | .00225 | | |
| 1.02 | .0025 | | |

If a tab is necessary, it is recommended that the airfoil coordinates be renormalized so as to preserve the basic airfoil contour definition.

Normalizing is accomplished by dividing both the x/c and y/c values of the modified airfoil by the new chord. For example, since the end of the tab is at a chordwise position of 1.02 all the x/c and y/c values are divided by 1.02. This is set forth in Table VII. Since the trailing edge of the airfoil was at a chordwise position of 1.02, when 1.02 is divided by 1.02 the new value is 1, thus, normalizing is accomplished. When all the y/c values are also divided by 1.02 normalizing is complete with an attendant re-scaling of the airfoil in conformance with the new chord. VR-12 with a 4% tab extending 2% beyond the trailing edge and then normalized is set forth in Table VIII.

TABLE VIII

VR-12
Plus 4% tab, normalized
(t/c — .104)

| x/c | y_u/c | x/c | y_l/c |
|---|---|---|---|
| .000000 | .000000 | .000000 | −.000000 |
| .000118 | .002356 | .000539 | −.002451 |
| .000784 | .006084 | .001961 | −.004680 |
| .001912 | .009498 | .003922 | −.006618 |
| .000333 | .012542 | .006078 | −.008235 |
| .005098 | .015510 | .008431 | −.009637 |
| .006863 | .017996 | .010784 | −.010735 |
| .008824 | .020405 | .014363 | −.012059 |
| .010833 | .022608 | .019167 | −.013235 |
| .013873 | .025586 | .025637 | −.014510 |
| .018235 | .029333 | .033627 | −.015735 |
| .024020 | .033667 | .043618 | −.017059 |
| .031422 | .038441 | .055784 | −.018529 |
| .040784 | .043382 | .071029 | −.020098 |
| .052451 | .048725 | .090588 | −.021667 |
| .067157 | .054216 | .116176 | −.023382 |
| .086274 | .059412 | .147059 | −.025049 |
| .111765 | .064314 | .196078 | −.027059 |
| .147059 | .068627 | .245098 | −.028529 |
| .196078 | .071765 | .294118 | −.029510 |
| .245098 | .073137 | .343137 | −.030196 |
| .294118 | .073627 | .392157 | −.030490 |
| .343137 | .073382 | .441176 | −.030392 |
| .392157 | .072353 | .490196 | −.030049 |
| .441176 | .070343 | .539215 | −.029412 |
| .490196 | .067745 | .588235 | −.028496 |
| .539215 | .064069 | .637255 | −.027206 |
| .588235 | .059476 | .676470 | −.025905 |
| .637255 | .053676 | .715686 | −.024337 |
| .676470 | .048356 | .754902 | −.022455 |
| .715686 | .042474 | .794117 | −.020307 |
| .754902 | .036376 | .828431 | −.018158 |
| .794117 | .030160 | .862745 | −.015738 |
| .828431 | .024335 | .892156 | −.013055 |
| .862745 | .018385 | .916666 | −.010623 |
| .892156 | .013349 | .936274 | −.008600 |
| .916666 | .009152 | .950980 | −.006651 |
| .936274 | .006050 | .960784 | −.005392 |
| .950980 | .004151 | .970588 | −.004692 |
| .960784 | .003063 | .975490 | −.004482 |
| .970588 | .002120 | .980392 | −.004272 |
| .975490 | .001698 | .987744 | −.003957 |
| .980392 | .001471 | .995098 | −.003641 |
| .987744 | .001838 | 1.000000 | −.003431 |
| .995098 | .002206 | | |
| 1.000000 | .002451 | | |

Figure 8A:
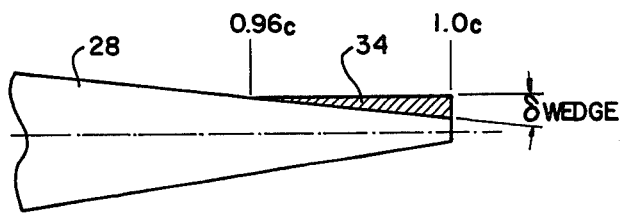
FIGS. 8a–b show trailing edge wedges which are used to alter the pitching moment characteristics of the airfoils of the present invention.
Figure 8B:
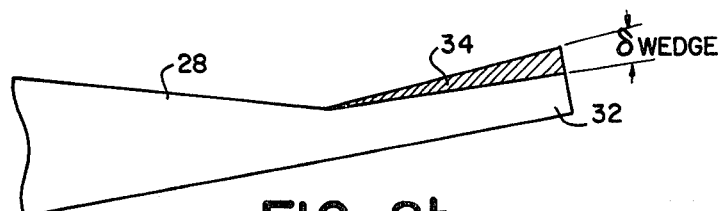

Pitching moment compensation may also be achieved by means of trailing edge wedges affixed to either the upper or lower surface of the trailing edge of the airfoil, with or without a trailing edge tab. This may be done by applying the wedge to the basic airfoil or to an airfoil which has been modified with a tab in accordance with the foregoing discussion. FIG. 8a shows a wedge 34 applied to a basic airfoil. The wedge has a length equal to 4% of the local blade chord and has a wedge angle δ. The wedge angle δ is defined as the angle between the surface to which the wedge is applied to and the wedge outer surface. In FIG. 8a the trailing edge of the wedge is coincident with the trailing edge of the basic airfoil. In FIG. 8b wedge 34 is shown applied to an airfoil which has previously been modified by a tab 32. In this case, the wedge extends to the trailing edge of the modified blade. Test results have shown that a wedge having a length equal to 4% of the basic airfoil's chord will change the airfoil's pitching moment about its quarter chord by approximately 0.003 per degree of wedge angle δ, for an upper surface wedge. When combining a wedge 34 with a tab 32 the change in pitch which is anticipated is the sum of the change which would be expected by the tab alone and the wedge alone in accordance with the preceding discussion. A summary of the performance characteristic and thickness ratios of the particular airfoils within the family of the present invention is set forth in Table IX.

It has been found for the present family of airfoils that an increase of $c_{m_o}$ of 0.01 will result in a decrease of $c_{l_{max}}$ of approximately 0.1. $C_{m_o}$ may be changed by altering camber, addition of tabs or wedges, or by a combination thereof. As previously indicated, the basic unaltered family has a $c_{m_o}$ of $-0.006\pm0.002$, as indicated by test result.

TABLE IX

| AIRFOIL VR-XX | PERFORMANCE FOR VR-XX | | | |
|---|---|---|---|---|
| | t/c | $c_{l_{max}}$(M = .4) | $M_{ddo}$ | $c_{mo}$ |
| VR-12 | .1062 | 1.52 | .802 | −.007 |
| VR-12 +4% TAB Normalized | .104 | 1.55 | .792 | .000 |
| VR-13 | .095 | 1.44 | .810 | −.007 |
| VR-14 | .08 | 1.30 | .833 | −.005 |
| VR-15 | .08 | 1.17 | .835 | +.006 |

As may be understood by those skilled in the art, from the foregoing description and drawings, the present invention represents a significant advance over the prior art. While the invention has been illustrated and disclosed in general and with reference to particular airfoils of the family of airfoils of the present invention, it is to be understood that various changes and modifications may be made without departing from the spirit thereof.

What is claimed is:

1. A rotor blade for a rotorcraft which comprises: a spanwise member, said spanwise member having an airfoil shaped cross section having a curved leading edge and a sharp trailing edge and having a pitching element coefficient at zero lift within the range of ±0.01, a maximum coefficient of lift greater than 1.2, and a drag divergence mach number at zero lift greater than 0.78, wherein the values of the coefficient of lift are at mach numbers of approximately 0.4 and the pitching moment coefficient at zero lift is at a low speed.

2. The apparatus of claim 1 wherein the combination of $c_{l_{max}}$ and $M_{ddo}$, which uniquely define said airfoils cross section performance, for said airfoil cross section falls between $c_{l_{max}}=1.6$, $M_{ddo}=0.78$ and $c_{l_{max}}=1.2$, $M_{ddo}=0.85$, wherein $c_{l_{max}}$ is said maximum coefficient of lift and $M_{ddo}$ is said drag divergence mach number at zero lift.

3. The apparatus of claim 2 wherein $c_{l_{max}}$ and $M_{ddo}$ for said airfoil cross section substantially fall on a line defined by the following coordinates for a $c_{mo}$ of approximately $-0.006$:

| $M_{ddo}$ | $c_{l_{max}}$ |
|---|---|
| 0.78 | 1.60 |
| 0.79 | 1.55 |
| 0.80 | 1.50 |
| 0.81 | 1.45 |
| 0.82 | 1.38 |
| 0.83 | 1.33 |
| 0.84 | 1.26 |
| 0.85 | 1.20 | where $c_{mo}$ is said pitching moment coefficient at zero lift and where the values of $c_{l_{max}}$, increase by approximately 0.1 for each decrease in $c_{mo}$ of approximately 0.01 and, decreases by 0.1 for each increase in $c_{mo}$ of approximately 0.01 and wherein the values of $c_{mo}$ are at a mach number of less than 0.3.

4. The apparatus of claim 3 wherein said airfoil cross section is further substantially defined by the following coordinate system:

| x/c | $y_u$/c | x/c | $y_l$/c |
|---|---|---|---|
| 0.0 | 0.0 | 0.0 | 0.0 |
| .00012 | .02263 | .00055 | −.0235405 |
| .00080 | .0584313 | .00200 | −.0442561 |
| .00195 | .0912241 | .0040 | −.0635593 |
| .00340 | .1204614 | .0062 | −.0790960 |
| .00520 | .1489642 | .0086 | −.0925612 |
| .0070 | .1728437 | .011 | −.10310734 |
| .00900 | .1959793 | .01465 | −.1158192 |
| .01105 | .2171375 | .01955 | −.1271186 |
| .01415 | .245744 | .02615 | −.1393597 |
| .01860 | .2817326 | .0343 | −.1511299 |
| .02450 | .323352 | .04449 | −.1638418 |
| .03205 | .369209 | .0569 | −.177966 |
| .0416 | .416666 | .07245 | −.193032 |
| .0535 | .467985 | .0924 | −.20809793 |
| .0685 | .520716 | .1185 | −.2245763 |
| .0880 | .570621 | .15 | −.2405838 |
| .1140 | .6177024 | .20 | −.259887 |
| .15 | .6591337 | .25 | −.2740113 |
| .20 | .689266 | .3 | −.2834275 |
| .25 | .702448 | .35 | −.2900188 |
| .30 | .7071563 | .4 | −.2928437 |
| .35 | .7048023 | .45 | −.29190207 |
| .40 | .6949152 | .5 | −.2886064 |
| .45 | .6756120 | .55 | −.28248588 |
| .50 | .6506591 | .6 | −.27369115 |
| .55 | .6153484 | .65 | −.26129943 |
| .60 | .57124294 | .69 | −.24880132 |
| .65 | .5155367 | .73 | −.2337476 |
| .69 | .4644322 | .77 | −.21566855 |
| .73 | .4079473 | .81 | −.19503766 |
| .77 | .3493785 | .845 | −.17440207 |
| .81 | .289670 | .88 | −.1511516 |
| .845 | .233724 | .91 | −.12538606 |
| .88 | .176575 | .935 | −.1020245 |
| .91 | .1282109 | .955 | −.08259416 |
| .935 | .0879002 | .97 | −.0638795 |
| .955 | .05811205 | .98 | −.04919021 |
| .97 | .0398682 | .99 | −.03354708 |
| .98 | .0294162 | .995 | −.02383 |
| .99 | .0203644 | 1.0 | −.0141243 |
| .995 | .0163041 | | |
| 1.0 | .0141243 | | | where; x is a distance from the blade leading edge along the blade chord line; c is the length of the blade chord; $y_u$ is the distance point on the upper surface of the airfoil is from the chord line along a line perpendicular to the chord line; $y_l$ is the distance a point on the lower surface of the airfoil is from the chord line along a line perpendicular to the chord line; $y_u/c$ and $y_l/c$ are set forth for a thickness ratio, t/c of one (1), where t is the airfoils maximum thickness; $y_u/c$ and $y_l/c$ are multiplied by a scale factor equal to t/c; and where the airfoils leading edge is substantially defined by the following parabolas:

$$(y_u/c)^2 = 4.2676129 \, (t/c)^2(x/c)$$

$$(y_l/c)^2 = (t/c)^2(x/c)$$

where said parabolas are faired into the airfoil defined by said coordinate system.

5. A rotor blade for a rotorcraft having an airfoil substantially defined by the following coordinate system:

| x/c | $y_u$/c | x/c | $y_l$/c |
|---|---|---|---|
| 0.0 | 0.0 | 0.0 | 0.0 |

-continued

| x/c | $y_u/c$ | x/c | $y_l/c$ |
|---|---|---|---|
| .00012 | .02263 | .00055 | −.0235405 |
| .00080 | .0584313 | .00200 | −.0442561 |
| .00195 | .0912241 | .0040 | −.0635593 |
| .00340 | .1204614 | .0062 | −.0790960 |
| .00520 | .1489642 | .0086 | −.0925612 |
| .00700 | .1728437 | .011 | −.10310734 |
| .00900 | .1959793 | .01465 | −.1158192 |
| .01105 | .2171375 | .01955 | −.1271186 |
| .01415 | .245744 | .02615 | −.1393597 |
| .01860 | .2817326 | .0343 | −.1511299 |
| .02450 | .323352 | .04449 | −.1638418 |
| .03205 | .369209 | .0569 | −.177966 |
| .0416 | .416666 | .07245 | −.193032 |
| .0535 | .467985 | .0924 | −.20809793 |
| .0685 | .520716 | .1185 | −.2245763 |
| .0880 | .570621 | .15 | −.2405838 |
| .1140 | .6177024 | .20 | −.259887 |
| .15 | .6591337 | .25 | −.2740113 |
| .20 | .689266 | .3 | −.2834275 |
| .25 | .702448 | .35 | −.2900188 |
| .30 | .7071563 | .4 | −.2928437 |
| .35 | .7048023 | .45 | −.29190207 |
| .40 | .6949152 | .5 | −.2886064 |
| .45 | .6756120 | .55 | −.28248588 |
| .50 | .6506591 | .6 | −.27369115 |
| .55 | .6153484 | .65 | −.26129943 |
| .60 | .57124294 | .69 | −.24880132 |
| .65 | .5155367 | .73 | −.2337476 |
| .69 | .4644322 | .77 | −.21566855 |
| .73 | .4079473 | .81 | −.19503766 |
| .77 | .3493785 | .845 | −.17440207 |
| .81 | .289670 | .88 | −.1511516 |
| .845 | .233724 | .91 | −.12538606 |
| .88 | .176575 | .935 | −.1020245 |
| .91 | .1282109 | .955 | −.08259416 |
| .935 | .0879002 | .97 | −.0638795 |
| .955 | .05811205 | .98 | −.04919021 |
| .97 | .0398682 | .99 | −.03354708 |
| .98 | .0294162 | .995 | −.02383 |
| .99 | .0203644 | 1.0 | −.0141243 |
| .995 | .0163041 | | |
| 1.0 | .0141243 | | | where x is a distance from the blade leading edge along the blade chord line; c is the length of the blade chord; $y_u$ is the distance a point on the upper surface of the airfoil is from the chord line along a line perpendicular to the chord line; $y_l$ is the distance a point on the lower surface of the airfoil is form the chord line along a line perpendicular to the chord line; $y_u/c$ and $y_l/c$ are set forth for a thickness ratio, t/c of one (1), where t is the airfoils maximum thickness; $y_u/c$ and $y_l/c$ are multiplied by a scale factor equal to t/c; and where the airfoils leading edge is substantially defined by the following parabolas:

$$(y_u/c)^2 = 4.2676129 \, (t/c)^2 (x/c)$$

$$(y_l/c)^2 = (t/c)^2 (x/c)$$

where said parabolas are faired into the airfoil defined by said coordinate system.

6. The apparatus of claim 5 where t/c is within the range of 0.06 to 0.15.

7. The apparatus of claim 6 where t/c substantially equals 0.1062.

8. The apparatus of claim 6 where t/c substantially equals 0.095.

9. The apparatus of claim 6 where t/c substantially equals 0.08.

10. The apparatus of claims 5, 6, 7, 8, or 9 where a first scale factor is applied to $y_u/c$ and a second scale factor is applied to $y_l/c$, said first and second scale factors being unequal.

11. The apparatus of claim 10 wherein the trailing edge of said airfoil cross section includes a trailing edge tab.

12. The apparatus of claim 11 wherein said airfoil cross section is normalized.

13. The apparatus of claim 12 wherein the trailing edge of said airfoil cross section includes a wedge.

14. The apparatus of claim 10 wherein the trailing edge of said airfoil cross section includes a wedge.

15. The apparatus of claim 14 wherein said airfoil cross section is normalized.

16. The apparatus of claims 5, 6, 7, 8, or 9 where a first scale factor is applied to $y_l/c$, said first and second scale factors being equal.

17. The apparatus of claim 16 wherein the trailing edge of said airfoil cross section includes a trailing edge tab.

18. The apparatus of claim 17 wherein said airfoil cross section is normalized.

19. The apparatus of claim 18 wherein the trailing edge of said airfoil cross section includes a wedge.

20. The apparatus of claim 16 wherein the trailing edge of said airfoil cross section includes a wedge.

21. The apparatus of claim 20 wherein said airfoil cross section is normalized.

22. A rotor blade for a rotorcraft having an airfoil cross section having a $c_{mo}$ of approximately −0.006, and wherein the maximum coefficient of lift, $c_{lmax}$, and the drag divergence mach number at zero lift, $M_{ddo}$, for said airfoil cross section substantially fall on a line defined by the following coordinates:

| $M_{ddo}$ | $c_{lmax}$ |
|---|---|
| 0.78 | 1.60 |
| 0.79 | 1.55 |
| 0.80 | 1.50 |
| 0.81 | 1.45 |
| 0.82 | 1.38 |
| 0.83 | 1.33 |
| 0.84 | 1.26 |
| 0.85 | 1.20 | where $c_{mo}$ is said pitching moment coefficient at zero lift and where the values of $c_{lmax}$, increase by approximately 0.1 for each decrease in said value of $c_{mo}$ of approximately 0.01 and, decreases by 0.1 for each increase in said value of $c_{mo}$ of approximately 0.01 and wherein the values of $c_{mo}$ are at a mach number of less than 0.3, and said airfoil cross section is further substantially defined by the following coordinate system:

| x/c | $y_u/c$ | x/c | $y_l/c$ |
|---|---|---|---|
| 0.0 | 0.0 | 0.0 | 0.0 |
| .00012 | .02263 | .00055 | −.0235405 |
| .00080 | .0584313 | .00200 | −.0442561 |
| .00195 | .0912241 | .0040 | −.0635593 |
| .00340 | .1204614 | .0062 | −.0790960 |
| .00520 | .1489642 | .0086 | −.0925612 |
| .00700 | .1728437 | .011 | −.10310734 |
| .00900 | .1959793 | .01465 | −.1158192 |
| .01105 | .2171375 | .01955 | −.1271186 |
| .01415 | .245744 | .02615 | −.1393597 |
| .01860 | .2817326 | .0343 | −.1511299 |
| .02450 | .323352 | .04449 | −.1638418 |
| .03205 | .369209 | .0569 | −.177966 |
| .0416 | .416666 | .07245 | −.193032 |
| .0535 | .467985 | .0924 | −.20809793 |
| .0685 | .520716 | .1185 | −.2245763 |

-continued

| x/c | $y_u/c$ | x/c | $y_l/c$ |
|---|---|---|---|
| .0880 | .570621 | .15 | −.2405838 |
| .1140 | .6177024 | .20 | −.259887 |
| .15 | .6591337 | .25 | −.2740113 |
| .20 | .689266 | .3 | −.2834275 |
| .25 | .702448 | .35 | −.2900188 |
| .30 | .7071563 | .4 | −.2928437 |
| .35 | .7048023 | .45 | −.29190207 |
| .40 | .6949152 | .5 | −.2886064 |
| .45 | .6756120 | .55 | −.28248588 |
| .50 | .6506591 | .6 | −.27369115 |
| .55 | .6153484 | .65 | −.26129943 |
| .60 | .57124294 | .69 | −.24880132 |
| .65 | .5155367 | .73 | −.2337476 |
| .69 | .4644322 | .77 | −.21566855 |
| .73 | .4079473 | .81 | −.19503766 |
| .77 | .3493785 | .845 | −.17440207 |
| .81 | .289670 | .88 | −.1511516 |
| .845 | .233724 | .91 | −.12538606 |
| .88 | .176575 | .935 | −.1020245 |
| .91 | .1282109 | .955 | −.08259416 |
| .935 | .0879002 | .97 | −.0638795 |
| .955 | .05811205 | .98 | −.04919021 |
| .97 | .0398682 | .99 | −.03354708 |
| .98 | .0294162 | .995 | −.02383 |
| .99 | .0203644 | 1.0 | −.0141243 |
| .995 | .0163401 | | |
| 1.0 | .0141243 | | | where; x is a distance from the blade leading edge along the blade chord line; c is the length of the blade chord; $y_u$ is the distance point on the upper surface of the airfoil is from the chord line along a line perpendicular to the chord line; $y_l$ is the distance a point on the lower surface of the airfoil is from the chord line along a line perpendicular to the chord line; $y_u/c$ and $y_l/c$ are set forth for a thickness ratio, t/c of one (1), where t is the airfoils maximum thickness; $y_u/c$ and $y_l/c$ are multiplied by a scale factor equal to t/c; and where the airfoils leading edge is substantially defined by the following parabolas:

$$(y_u/c)^2 = 4.2676129 \, (t/c)^2 (x/c)$$

$$(y_l/c)^2 = (t/c)^2 (x/c)$$

where said parabolas are faired into the airfoil defined by said coordinate system.

23. A rotor blade for a rotorcraft which comprises: a spar having a root end, a tip end and lift producing means connected to said spar, said lift producing means having an airfold cross section having a nominal $c_{mo}$ of approximately −0.006 and wherein the maximum coefficient of lift, $c_{lmax}$, and the drag divergence mach number, $M_{ddo}$, for said airfoil cross section substantially fall within the region defined by the following coordinates:

| $M_{ddo}$ | $c_{lmax}$ |
|---|---|
| 0.78 | 1.60 |
| 0.79 | 1.55 |
| 0.80 | 1.50 |
| 0.81 | 1.45 |
| 0.82 | 1.38 |
| 0.83 | 1.33 |
| 0.84 | 1.26 |
| 0.85 | 1.20 | where $c_{mo}$ is said pitching moment coefficient at zero lift and where the values of $c_{lmax}$ may vary ±0.2 from the values set forth above and wherein $c_{lmax}$ increases by approximately 0.1 for each decrease in said value of $c_{mo}$ of approximately 0.01 and, decreases by 0.1 for each increase in said value of $c_{mo}$ of approximately 0.01 and wherein the values of $c_{mo}$ are at a mach number of less than 0.3.

24. The apparatus of claim 23 wherein said airfoil cross section is further substantially defined by the following coordinate system:

| x/c | $y_u/c$ | x/c | $y_l/c$ |
|---|---|---|---|
| 0.0 | 0.0 | 0.0 | 0.0 |
| .00012 | .02263 | .00055 | −.0235405 |
| .00080 | .0584313 | .00200 | −.0442561 |
| .00195 | .0912241 | .0040 | −.0635593 |
| .00340 | .1204614 | .0062 | −.0790960 |
| .00520 | .1489642 | .0086 | −.0925612 |
| .00700 | .1728437 | .011 | −.10310734 |
| .00900 | .1959793 | .01465 | −.1158192 |
| .01105 | .2171375 | .01955 | −.1271186 |
| .01415 | .245744 | .02615 | −.1393597 |
| .01860 | .2817326 | .0343 | −.1511299 |
| .02450 | .323352 | .04449 | −.1638418 |
| .03205 | .369209 | .0569 | −.177966 |
| .0416 | .416666 | .07245 | −.193032 |
| .0535 | .467985 | .0924 | −.20809793 |
| .0685 | .520716 | .1185 | −.2245763 |
| .0880 | .570621 | .15 | −.2405838 |
| .1140 | .6177024 | .20 | −.259887 |
| .15 | .6591337 | .25 | −.2740113 |
| .20 | .689266 | .3 | −.2834275 |
| .25 | .702448 | .35 | −.2900188 |
| .30 | .7071563 | .4 | −.2928437 |
| .35 | .7048023 | .45 | −.29190207 |
| .40 | .6949152 | .5 | −.2886064 |
| .45 | .6756120 | .55 | −.28248588 |
| .50 | .6506591 | .6 | −.27369115 |
| .55 | .6153484 | .65 | −.26129943 |
| .60 | .57124294 | .69 | −.24880132 |
| .65 | .5155367 | .73 | −.2337476 |
| .69 | .4644322 | .77 | −.21566855 |
| .73 | .4079473 | .81 | −.19503766 |
| .77 | .3493785 | .845 | −.17440207 |
| .81 | .289670 | .88 | −.1511516 |
| .845 | .233724 | .91 | −.12538606 |
| 88 | .176575 | .935 | −.1020245 |
| .91 | .1282109 | .955 | −.08259416 |
| .935 | .0879002 | .97 | −.0638795 |
| .955 | .05811205 | .98 | −.04919021 |
| .97 | .0398682 | .99 | −.03354708 |
| .98 | .0294162 | .995 | −.02383 |
| .99 | .0203644 | 1.0 | −.0141243 |
| .995 | .0163041 | | |
| 1.0 | .0141243 | | | where; x is a distance from the blade leading edge along the blade chord line; c is the length of the blade chord; $y_u$ is the distance point on the upper surface of the airfoil is from the chord line along a line perpendicular to the chord line; $y_l$ is the distance a point on the lower surface of the airfoil is from the chord line along a line perpendicular to the chord line; $y_u/c$ and $y_l/c$ are set forth for a thickness ratio, t/c of one (1), where t is the airfoils maximum thickness; $y_u/c$ and $y_l/c$ are multiplied by a scale factor equal to t/c; and where the airfoils leading edge is substantially defined by the following parabolas:

$$(y_u/c)^2 = 4.2676129 \, (t/c)^2 (x/c)$$

$$(y_l/c)^2 = (t/c)^2 (x/c)$$

where said parabolas are faired into the airfoil defined by said coordinate system.

* * * * *

UNITED STATES PATENT AND TRADEMARK OFFICE
CERTIFICATE OF CORRECTION

PATENT NO. : 4,314,795

DATED : February 9, 1982

INVENTOR(S) : Leone U. Dadone

It is certified that error appears in the above-identified patent and that said Letters Patent are hereby corrected as shown below:

--Column 8, Table IV, the sixth value under heading $y_1/c$, delete "/c" and in its stead place a minus sign (-), so that it reads -0.008793.

--Column 8, Table IV, the last line in the table, delete the parameter which reads "$(y/c)^2$" and place in its stead $(y_1/c)^2$.

--Column 9, Table V, the ninth value under heading x/c, plac a decimal point in front of the 30 so that it reads .30.

Column 15,
--Claim 1, line 35, delete the word "element" and in its stead place the word moment.

Column 16,
--Claim 4, in the table, the seventh value under the heading x/c, delete the value ".0070", and place in its stead the value .00700.

--Claim 22, at column 19, in the table, the 26th value under heading $y_u/c$, delete the value ".0163401" and in its stead place the correct value .0163041 --.

Signed and Sealed this

First Day of February 1983

[SEAL]

Attest:

GERALD J. MOSSINGHOFF

Attesting Officer        Commissioner of Patents and Trademarks